United States Patent [19]

Funken et al.

[11] Patent Number: 5,527,985
[45] Date of Patent: Jun. 18, 1996

[54] PROCESS FOR RECYCLING WASTE SULFURIC ACID

[75] Inventors: Karl-Heinz Funken, Bonn; Oliver Weinmann, Hamburg; Karl-Friedrich Knoche, Aachen; Rudolf Sizmann, Munich, all of Germany

[73] Assignee: Deutsche Forschungsanstalt für Luft-und Raumfahrt e.V., Cologne, Germany

[21] Appl. No.: 427,981

[22] Filed: Apr. 21, 1995

Related U.S. Application Data

[63] Continuation of Ser. No. 63,308, May 19, 1993, abandoned.

[30] Foreign Application Priority Data

May 19, 1992 [DE] Germany .......................... 42 16 499.0

[51] Int. Cl.⁶ .................................................. A62D 3/00
[52] U.S. Cl. ..................... 588/227; 588/215; 588/219; 204/157.4; 204/157.49; 204/157.5; 204/157.52; 204/158.21; 423/531
[58] Field of Search ........................... 204/157.4, 157.49, 204/157.5, 157.52, 158.21; 588/215, 219, 227; 423/531

[56] References Cited

U.S. PATENT DOCUMENTS

| 4,042,334 | 8/1977 | Matovich | 23/252 |
|---|---|---|---|
| 4,671,951 | 6/1987 | Masse | 204/157.49 |

FOREIGN PATENT DOCUMENTS

| 3018664 | 9/1980 | Germany . | |
| 3216420 | 11/1983 | Germany . | |

OTHER PUBLICATIONS

Weinmann, O. et al., Thermal Recovery of Waste Sulfuric Acid with Concentrated Solar Radiation, Translation of 7 Internationales Sonnen Forum, Frankfurt, vol. 2, pp. 1076–1081 (1990).

Bohmer, M. et al., "Development of Volumetric Air Receivers", 1991 Solar World Congress, vo. 2, Part II, pp. 2123–2128 (Aug., 1991).

Becker, M. and Vant–Hull, L. L., "Thermal Receivers", Solar Power Plants, Chapter 5, pp. 162–167 and 184–191 (1991).

*Primary Examiner*—John Niebling
*Assistant Examiner*—C. Delacroix-Muirheid
*Attorney, Agent, or Firm*—Fitzpatrick, Cella, Harper & Scinto

[57] ABSTRACT

A process for recycling waste sulfuric acid by decomposing organic contaminants by use of light energy, comprising exposing a waste sulfuric acid containing contaminants to a focused radiation emission having an irradiation intensity within the range of from 0.01 to 100 MW/m² in a reaction chamber shaped as a directly-absorbing receiver, wherein the chamber is maintained at a temperature within the range of from 200° C. to 1000° C. to form sulfur trioxide and water as sulfuric acid decomposition products. The process also includes forming sulfur dioxide and oxygen, starting materials for sulfuric acid, by cleavage of the decomposition product sulfur trioxide by maintaining the reaction chamber at a temperature between 400° C. and 1500° C. The process, particularly adapted for irradiations with direct solar radiation.

35 Claims, 4 Drawing Sheets

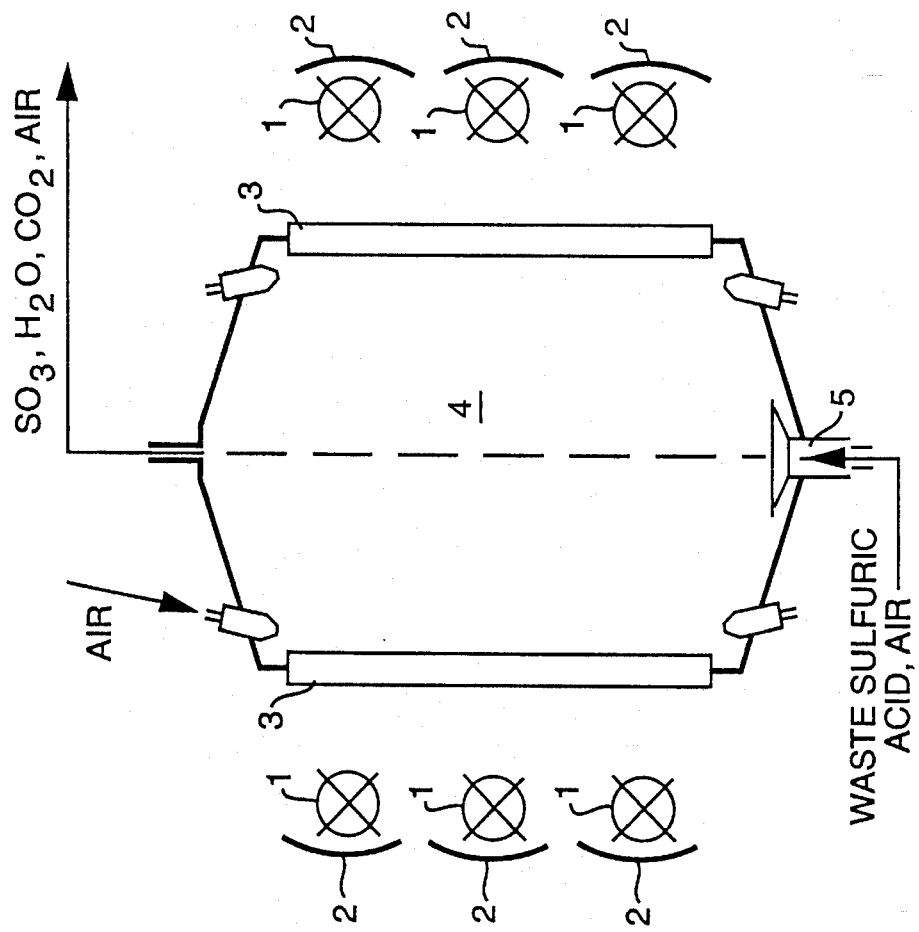
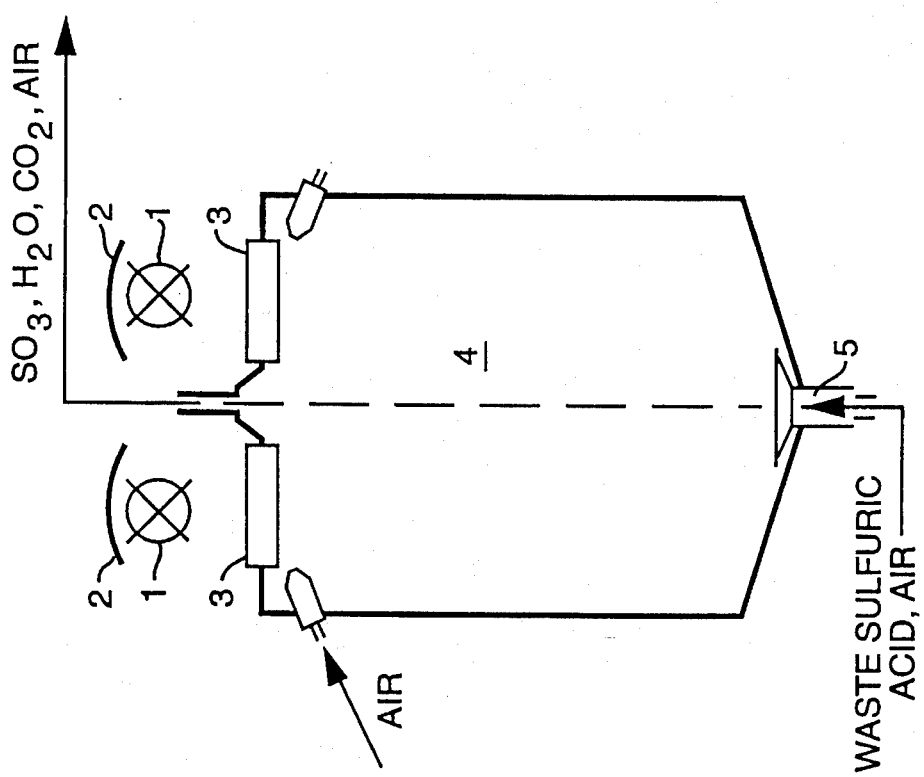
FIG. 1
FIG. 2

PROCESS FOR RECYCLING WASTE SULFURIC ACID

This application is a continuation of application Ser. No. 08/063,308 filed May 19, 1993, now abandoned.

BACKGROUND OF THE INVENTION

The invention relates to a process for recycling waste sulfuric acids by the decomposition of organic contaminants using light energy.

Sulfuric acid is used as a reactant or auxiliary material in numerous processes in the chemical industry and in mineral oil refining. In the course of the respective process, a large amount of the sulfuric acid employed is frequently converted into waste sulfuric acid.

The most important basic processes of organic-chemical technology using sulfuric acid, oleum and/or sulfur trioxide include, for example, sulfonations, sulfochlorinations, sulfations, exchange reactions of sulfonate groups, nitrations, hydrations of olefins to form alcohols and ethers, processes for producing polyamide precursors, processes for producing methacrylic acid esters and of other organic acids or derivatives thereof, digestion processes and processes for treating waste liquors in the pulp and paper industry, processes for saccharification of starch- and cellulose-containing materials as well as for the production of furfurol and gelatin, processes for the production of nitrocellulose and of explosives, processes for refining lubricants, regeneration of used oils, waxes, tar oils and of crude benzene, as well as general alkylation processes in the mineral oil industry.

Waste sulfuric acid is frequently contaminated with reaction by-products or diluted materials and possibly with microparticles. Alternatively, the sulfuric acid is diluted with water to such a degree that it can no longer be utilized for technical purposes and will have to be discarded. For reasons of environmental protection, disposal mechanisms such as the dumping of waste sulfuric acid into the open sea or into landfills are no longer tolerable and also are no longer permitted by an increasing number of countries. Thus, waste sulfuric acid must be recycled to give a reusable fresh acid.

To date, the prior art follows two different approaches:

1) Concentrating, and if desired or required, concentrating to a high degree of waste sulfuric acid which is frequently obtained having concentrations within the range of 20–70%; and 2) high-temperature recycling of a highly contaminated waste sulfuric acid by decomposing it into water, sulfur dioxide and oxygen (cf. Winnacker/Küchler, Chemische Technologie, 4th edition, vol. 2, page 1 et seq.).

The concentrating process hitherto has been used primarily for the purification of a diluted waste sulfuric acid containing a low level of contaminants, where the contaminants are readily removable or where the purity requirements for the regenerate are not particularly high (such as, for example, for sulfuric acid employed for the development of ilmenite in the production of titanium dioxide). If, however, the regenerate is to meet higher requirements or a highly contaminated waste sulfuric acid is intended to be recycled by concentration, then additional cost-intensive purification procedures are required. These include, especially in the case of waste sulfuric acids bearing organic contaminants, the use of strong oxidants such as hydrogen peroxide or nitric acid. Furthermore, concentrating procedures are employed for the preconcentration of highly diluted acids, before the acids are introduced into the cracking plant. When the amount of sulfuric acid is being concentrated to more than 70% by weight, then the sulfuric acid becomes dehydrated, and with further increases in temperature and sulfuric acid concentration, a sulfur trioxide partial pressure forms above the liquid phase. More specifically, the sulfuric acid decomposes above its boiling point in the gaseous phase to form sulfur trioxide and water. This reaction is reversible, so that sulfuric acid may be recovered after cooling.

The high temperature regeneration process via the decomposition of the sulfuric acid molecule is primarily employed in regenerating sulfuric acid which is highly contaminated with organic waste and for those cases either where the regenerate is to meet high demands with respect to its purity or where toxic matter will have to be safely destroyed. Sulfur dioxide, a decomposition product obtained from sulfur trioxide, is usually processed further in a subsequent sulfuric acid plant to form a concentrated fresh acid which is free from impurities.

A particular drawback inherent to the commercially employed processes for recycling waste sulfuric acid is the considerable operating cost to cover the energy requirements and, in the case of the high-temperature cracking, additional capital expenditure plus operating cost for a sulfuric acid plant. Moreover, the energy demand of the high temperature cracking procedure is higher than that of the concentrating procedure. The regeneration of waste sulfuric acid is more expensive than the production of fresh acid from the raw materials sulfur or pyrite. As a matter of fact, a high-temperature cracking plant for regenerating waste sulfuric acid preferably will be established as an interconnected operation with a sulfuric acid plant, wherein fresh acid is produced from the raw materials, so that the feed of raw materials can be reduced. However, it is disadvantageous that part of the capacity of the sulfuric acid plant is committed to the regeneration process. Another drawback of the processes as technically realized today is that the energy demand will regularly have to be satisfied by the combustion of fossil fuel. Nevertheless, plants using direct solar radiation, such as dish and tower systems equipped with reflectors acting to effect an optical concentration and with radiation recipients (receivers), have been developed for solar-thermal power generation in order to reduce the use of fossil carriers of primary energy and to avoid the emissions associated with combustion. Such plants are capable of providing a high-temperature processing heat in excess of 1000° C. O. Weinmann, K. H. Funken, K. F. Knoche, and R. Sizmann; DGS (Ed.) Tagungsbericht 7.Internationales Sonnenforum, Frankfurt, Oct. 9–12, 1990 Vol. 2, pages 1076–1981, proposing to utilize this source also for the decomposition of waste acid. The waste acid is injected into the volumetric receiver and is heated, dehydrated, evaporated and decomposed therein. The waste acid is directly exposed to highly concentrated solar radiation. An open volumetric receiver is chosen as the constructional design. However, a sufficiently high air stream will have to be drawn in so that sulfuric acid and/or reaction products are prevented from escaping into the surroundings. It is assumed that the oxidation of the organic contaminants could be accelerated by the direct irradiation with highly focussed sunlight in a volumetric receiver. A review on volumetric receivers is presented by C. J. Winter, R. L. Sizmann, L. L. Vant-Hull in Solar Power Plants, Springer-Velag, Berlin, Heidelberg, New York, 1991. In accordance therewith, a volumetric receiver consists of a volume space with a multiplicity of porous interconnected shaped articles, wire packs, foam or sheet assemblies made of metal, ceramic or other suitable materials. In volumetric receivers, the concentrated radiation heats the material present in the volume space. At the same time the heat transfer medium flows through the volume and is convectively heated. In order to achieve a high degree of absorption of the radiation, the volume is tightly filled with porous fillings. This results in providing narrow flow channels, a low radiation penetration depth and a relatively short residence time of the fluid medium in the irradiated zone (about 0.01 seconds in foam or sheet receivers). The conversion of the organic contaminants increases with an increase in the residence time. Experimental investigations have shown, however, that longer residence times are required for achieving a high conversion. Thus, volumetric receivers can no longer be considered as being suitable, since the residence time in the irradiated zone is too short.

SUMMARY OF THE INVENTION

Therefore, it is the object of the present invention to provide a process for recycling and regenerating a waste sulfuric acid, especially one contaminated with organic contaminants, in a facile and direct manner, so that additional purification during concentration and, if possible, high temperature decomposition can be avoided. Furthermore, the process is intended to allow the use of solar energy for recycling and regenerating waste sulfuric acid, in order to reduce consumption of fossil energy carriers.

The above-mentioned object is attained by a process for recycling waste sulfuric acid by decomposing organic contaminants by means of light energy. The process is characterized in that the waste sulfuric acid is exposed to an intensive radiation having an irradiation intensity within the range from 0.01 to 100 MW/m$^2$ in a reaction chamber shaped as a directly-absorbing receiver at an elevated temperature within the range from 200° C. to 1500° C. The process is optionally controlled so as to decompose the sulfuric acid molecule into sulfur dioxide, oxygen and water.

Unexpectedly, it has been found that the decomposition of organic contaminants, as measured by the total organic compound (hereafter indicated by "TOC") reduction, is significantly accelerated in the directly-absorbing receiver under the action of a highly concentrated radiation which, more particularly, may be a solar radiation, in comparison to an exclusively thermal treatment. Thus, in recycling waste sulfuric acid, this photochemical technology, in comparison to the conventional and exclusively thermal route, constitutes an approach to employing significantly lower temperatures and/or shorter residence times in the reaction chamber. It is expected that lower temperatures will allow for a reduction in the specific energy needed as well as a utilization of less expensive materials for the reaction chamber. In addition, an increased space-time throughput will reduce the specific capital expenditure for the recycling plant.

The process according to the invention advantageously provides that, in cases of recycling and regenerating a waste sulfuric acid having a low content of organic contaminants, further purification procedures can be abandoned. Another advantage of the process herein is that in the case where a waste acid is highly contaminated with organic matter, even the high-temperature decomposition and the subsequent processing steps of converting sulfur dioxide into fresh acid may be unnecessary. This leads to significant savings in the capital expenditure and operating cost of waste sulfuric acid recycling plants.

Alternatively, where the organic contaminants present are difficult to decompose and, hence, cannot successfully be subjected to the procedure as described above, decomposition of the sulfuric acid to form sulfur trioxide and the subsequent decomposition of sulfur trioxide to form sulfur dioxide and oxygen may still be carried out. However, the inherent advantage over per se known thermochemical decomposition procedures is that under the action of highly concentrated radiation the reaction rate of the TOC decomposition and of the cleavage into sulfur trioxide, sulfur dioxide, oxygen and water is distinctly increased. Thus, even at high reaction temperatures (comparable to those of conventional processes) the space-time throughput of the waste sulfuric acid may be clearly enhanced. This in turn saves on capital expenditure. On the other hand, the waste sulfuric acid may be decomposed even at lower temperatures with an acceptable reaction rate. Lower temperatures favor the expectation of a reduction of the specific energy demand, as well as the possible use of inexpensive materials for the reaction chamber. It was found that at a higher temperature the absorption spectrum of sulfur trioxide was shifted towards higher wavelengths.

In a directly-absorbing receiver, the radiation is substantially absorbed by the non-transparent fluid medium. The receiver is virtually shaped as an empty space wherein the medium is atomized. Thus, the penetration depth of the radiation and, in turn, the residence time in the irradiated zone are dependent on the optical density of the fluid medium and are not limited by the fillings and internal structures as in volumetric receivers.

Within the scope of the present invention, the terms "fillings" or "internal structures," as to the absorption of a radiation that is not absorbed by the fluid medium, are intended to include fillings or internal structures that are present in locations deeper in the receiver than those possible in a volumetric receiver.

Thus, the process according to the invention is particularly well suited for using an optically focused light radiation for accelerating the decomposition of organic contaminants and the cleavage of sulfur trioxide in recycling waste sulfuric acid into sulfur dioxide and oxygen. This aspect of the invention responds to the demand for a replacement of fossil carriers of primary energy by the regenerative energies. In countries having good solar conditions, the concentrated radiation can be advantageously provided from a highly focusing solar unit such as central receiver systems, paraboloid concentrators, fixed-focus concentrators or solar furnaces. The practical utility of such units for power generation and for the generation of high-temperature process heat has already been tested and described in the literature. Appropriate modifications of such units allow for the replacement of fossil energy carriers also in the recycling operation of waste sulfuric acid. In countries exhibiting less suitable solar conditions, the reaction rate-accelerating effect of a concentrated radiation from power-density lamps may be advantageously utilized. Accordingly, one particular embodiment of the present invention consists of using artificial radiators as a radiation source. The light radiation from such artificial radiators passes into the reaction chamber that is adapted as a directly-absorbing receiver through an optical assembly of mirrors and/or lenses.

BRIEF DESCRIPTION OF THE DRAWINGS

FIG. 1 depicts a plan view of an irradiation setup for the process according to the present invention.

FIG. 2 depicts a plan view of a second irradiation setup for the process according to another embodiment of the invention.

Figure 3A:
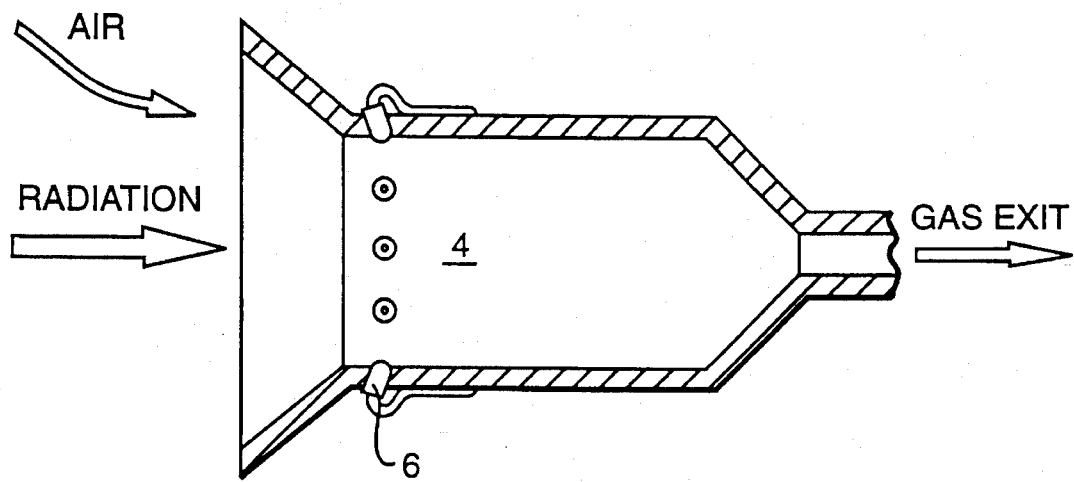
FIG. 3 depicts a directly-absorbing receiver for use in the embodiment utilizing solar radiation.

DETAILED DESCRIPTION OF THE
PREFERRED EMBODIMENTS

In FIG. 1, the light from the radiation source 1 is focussed by means of the mirrors 2 and passed through the windows 3 into the reaction chamber 4 designed as a directly-absorbing receiver. The waste sulfuric acid contaminated with organic material is atomized through a diffusor 5, e.g. by means of an ultrasonic atomizer or by injector nozzles, and fed into the reaction chamber. Alternatively, the waste sulfuric acid may also be directly atomized into the reaction chamber.

FIG. 2 shows an alternative embodiment of the reaction chamber 4 designed as a directly-absorbing receiver, said reaction chamber 4 being provided with laterally located windows 3. Thus, the stream comprising waste sulfuric acid and air can be introduced directly towards the focused radiation (FIG. 1), so that the lowest concentration of residual organic material will be present at the inlet site of the radiation. Alternatively, the stream can be passed by a plurality of radiators (FIG. 2).

In the case of lamp-operated units, and lamps and optical systems may be separated from the actual reaction chamber by the windows which preferably are made of quartz glass. Moreover, the windows should be provided with an air curtain in order to protect them from contaminants likely to be burnt in.

Figure 3B:
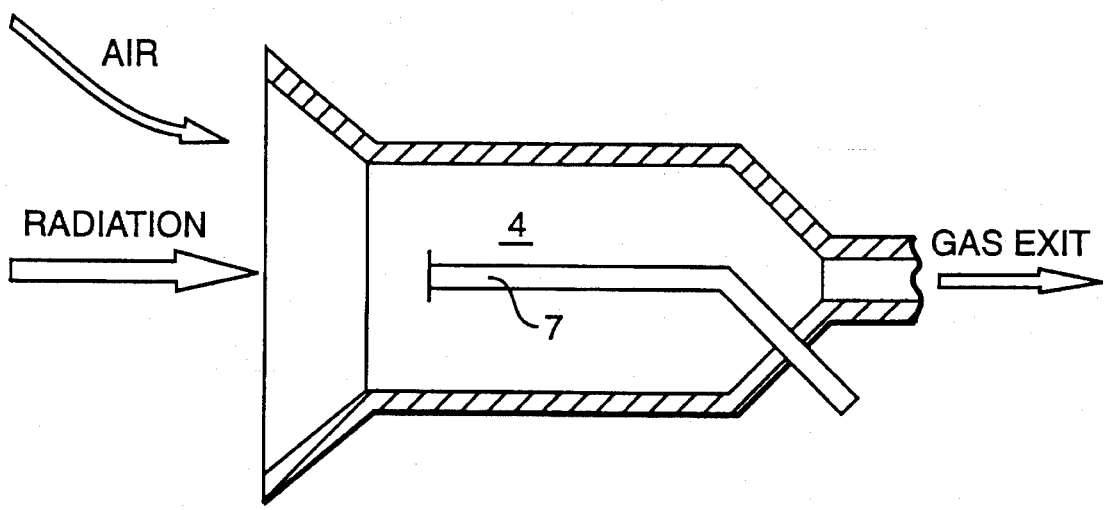

In the case of the solar units according to the present invention, the directly-absorbing receiver simultaneously acts as the reaction chamber 4, as is shown in FIG. 3, top and bottom. The respective reaction chambers 4 of the two directly-absorbing receivers of FIG. 3 are distinguished only by the mode of how the waste sulfuric acid is atomized. The latter may be introduced into the reaction chamber 4 either radially from the outside 6 or through an injector (lance) 7 inside the reaction chamber 4.

Figure 4A:
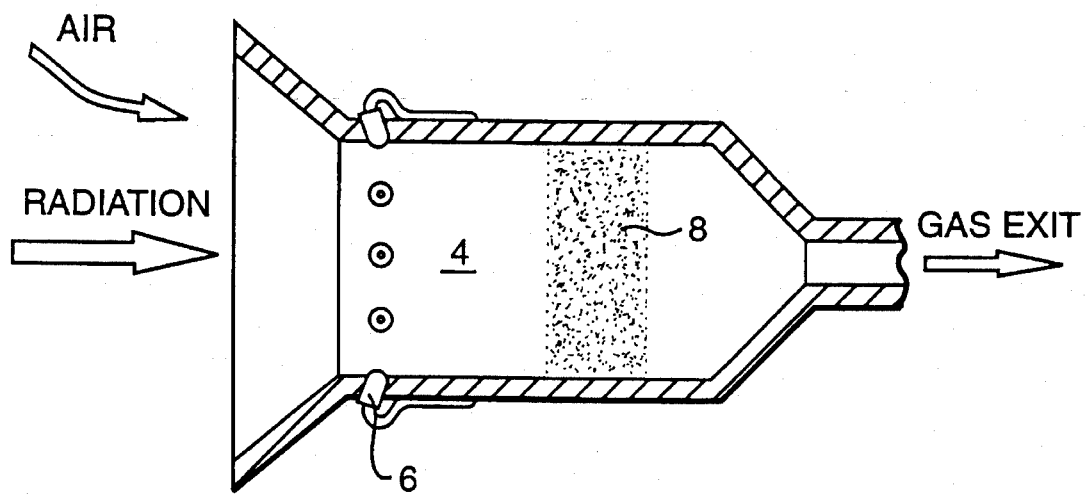
FIG. 4 depicts another directly-absorbing receiver for use in the embodiment utilizing solar radiation.
Figure 4B:
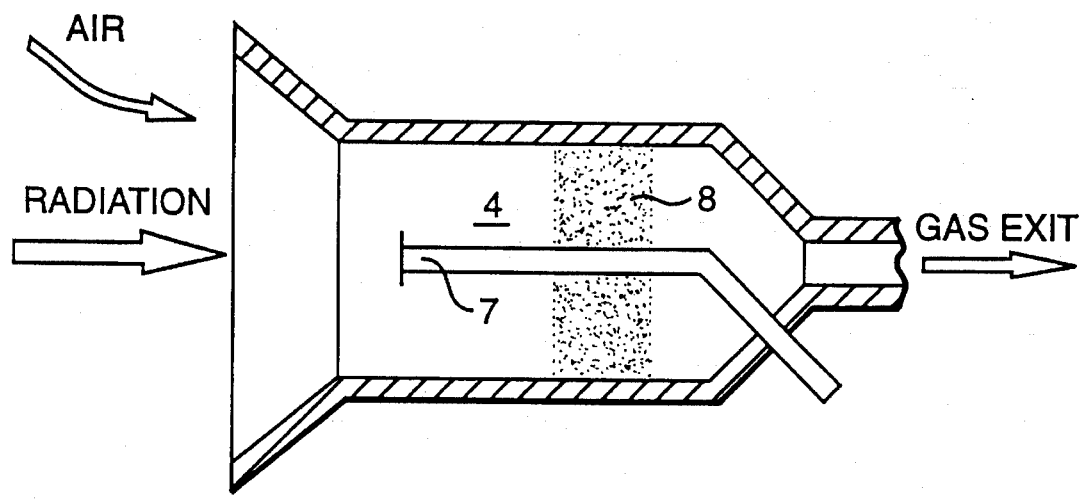

In FIG. 4, additional filling structures 8 are shown which may be present in the reaction chamber 4 according to the invention. Such filling structures, included in volumetric receivers serve to improve the energy balance, if the waste sulfuric acid introduced into the reaction chamber still has some transparency.

For separating the stream of the waste sulfuric acid and air from the source of radiation, it is preferred that the radiators and the optical system are separated from the receiver by windows. Furthermore, it is advantageous that the windows are protected from coatings caused by condensations or decomposition products by passing an air flow over the surfaces thereof.

A preferred embodiment of the present invention consists of introducing a stream comprising waste sulfuric acid and air directly towards (in a direction countercurrent to) the focussed radiation. Alternatively, there is a possibility that the stream comprising waste sulfuric acid and air is passed by a plurality of radiators.

More preferably, the volume ratios of waste sulfuric acid to air is adjusted to a value within the range of from 0.01 to 100. It is particularly preferred that the volume ratio of waste sulfuric acid to air is adjusted to a value within the range of from 0.25 to 10.

Another preferred embodiment of the present invention consists of generating the concentrated radiation with one or a plurality of high-performance lamp(s). A further alternative of the process according to the invention is utilizing the direct radiation from the sun as the source of radiation. Thus, in one particularly preferred embodiment of the present invention, a central receiver system, a paraboloid concentrator, a fixed-focus concentration or a solar furnace is used for focusing the solar radiation. Optionally, an elliptic or spherical mirror or a weakly concentrating vacuum tube collector may also be used. A line-focusing concentrator likewise may be employed for concentrating the solar radiation.

Another preferred embodiment of the present invention consists of adjusting the reaction temperature to a value within the range of from 200° C. to 1000° C., and especially from 500° C. to 800° C. to avoid any decomposition of the sulfur trioxide molecule. In cases where the decomposition of the sulfur trioxide molecule, into sulfur dioxide and oxygen, is tolerable or desirable, then it is preferred that the temperature is adjusted to a value within the range of from 400° C. to 1500° C., and especially from 700° C. to 1000° C.

The process according to the invention may meaningfully employ broad-spectrum radiators and, among these, especially the sun. It is preferred to employ light sources which have their emission maxima in the near UV (wavelengths higher than about 190 nm) or within the region of visible light. Alteratively, lamps emitting line spectra (such as, e.g., mercury high-pressure lamps) and being widely used in photo-chemistry can also be used, if only a substantial portion of the emitted light is within the above-mentioned UV and/or visible region.

Another preferred embodiment of the present invention consists of adjusting the irradiation intensity to the range of from 0.1 to 10 MW/m$^2$. A particularly preferred embodiment of the present invention is adjusting the irradiation intensity to the range of from 0.2 to 3 MW/m$^2$.

In yet still another preferred embodiment of the present invention the process utilizes both the heat of reaction of the reverse reaction between the decomposition products sulfur trioxide and water to reform sulfuric acid, and the sensed heat of the gases leaving the reaction chamber to preheat and superheat the waste sulfuric acid supplied to the reaction chamber.

EXAMPLES

Figure 5:
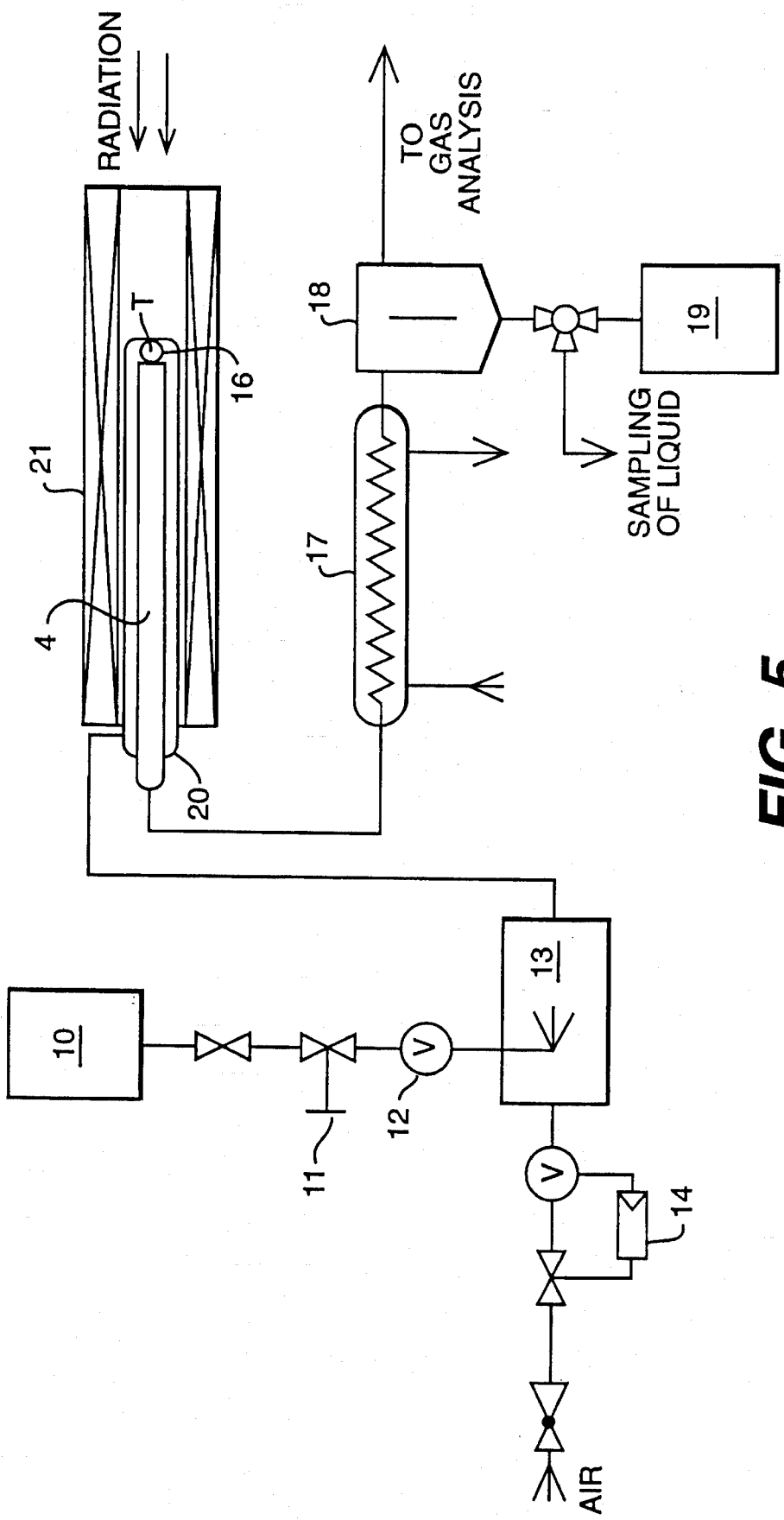
FIG. 5 is a schematic of the experimental setup used to compare the inventive process to a conventional method.

With reference to the schematic in FIG. 5, a diluted waste sulfuric acid ($H_2SO_4$ concentration 30% by weight; TOC content 22,500 ppm) is recycled in a directly-absorbing receiver. From a reservoir 10 a definite amount of waste sulfuric acid is taken through a control valve 11 and volume flowmeter 12 and passed to the mixing chamber 13 comprising an ultrasonic atomizer. In an analogous manner, air is introduced into the mixing chamber 13 through a volume flowmeter 14. Thus, a mixture comprising waste sulfuric acid and air is formed. The resulting mixture is passed to a tubular reactor 20 comprising the reaction chamber 4 designed as a directly-absorbing receiver. Therein, focused radiation is allowed to act on the waste sulfuric acid and air mixture. The reaction temperature is determined by means of the measuring device 16. The tubular reactor 20 made of quartz glass and having a front face transparent for the entering radiation is located in an electrically heated tubular furnace 21 that serves as a thermostat to heat the "thermal only" reference experiments, which are indicated hereafter as "comparative" examples. The jacket tube and internal tube of the tubular reactor have diameters of 45 mm and 20 mm, respectively, and are in positions concentric with respect to each other. In the irradiation experiments, 55 to 60% of the radiation provided by a high-pressure Xe radiation source (Xenon High Power Lamp 20 kW, 20000 D, Durotest Corp.), which is concentrated by a system of reflectors and lenses, is passed into the inner tube of the reaction chamber. The air/waste sulfuric acid mixture is advanced through the jacket tube tower the front face of the reactor and then through the inner tube to the reactor outlet. The resulting gas mixture comprising sulfuric acid, sulfur trioxide, sulfur dioxide, water, carbon dioxide, possibly undecomposed organic contaminants and air is fed to a heat exchanger 17 for cooling. Then, liquid constituents are removed in a separator 18. Thereafter, the reprocessed sulfuric acid is collected in the collection container 19, and is subjected in order to determine the residual TOC contents of the various samples.

Example 1

Temperature: 500° C.
Average irradiation intensity in the inner tube: 0.28 MW/m$^2$.
Average residence time in the inner tube: 0.22 s.
Volume flow waste sulfuric acid (liquid): 0.2 l/h.
Volume flow air: 1 l/min.
Residual TOC content: 2900 ppm.

Comparative Example 1

Temperature: 500° C. Not irradiated.
Average residence time in the inner tube: 0.22 s.
Volume flow waste sulfuric acid (liquid): 0.2 l/h.
Volume flow air: 1 l/min.
Residual TOC content: 3276 ppm.

Example 2

Temperature: 500° C.
Average irradiation intensity in the inner tube: 0.28 MW/m$^2$.
Average residence time in the inner tube: 0.16 s.
Volume flow waste sulfuric acid (liquid): 0.3 l/h.
Volume flow air: 1 l/min.
Residual TOC content: 2990 ppm.

Comparative Example 2

Temperature: 500° C. Not irradiated.
Average residence time in the inner tube: 0.16 s.
Volume flow waste sulfuric acid (liquid): 0.3 l/h.
Volume flow air: 1 l/min.
Residual TOC content: 3707 ppm.

Example 3

Temperature: 800° C.
Average irradiation intensity in the inner tube: 0.28 MW/m$^2$.
Average residence time in the inner tube: 0.25 s.
Volume flow waste sulfuric acid (liquid): 0.1 l/h.
Volume flow air: 1 l/min.
Residual TOC content: 402 ppm.

Comparative Example 3

Temperature: 800° C. Not irradiated.
Average residence time in the inner tube: 0.25 s.
Volume flow waste sulfuric acid (liquid): 0.1 l/h.
Volume flow air: 1 l/min.
Residual TOC content: 1035 ppm.

Example 4

Temperature: 800° C.
Average irradiation intensity in the inner tube: 0.88 MW/m$^2$.
Average residence time in the inner tube: 0.11 s.
Volume flow waste sulfuric acid (liquid): 0.3 l/h.
Volume flow air: 1 l/min.
Residual TOC content: 199 ppm.

Comparative Example 4:

Temperature: 800° C. Not irradiated.
Average residence time in the inner tube: 0.11 s.
Volume flow waste sulfuric acid (liquid): 0.3 l/h.
Volume flow air: 1 l/min.
Residual TOC content: 1337 ppm.

While the present invention has been described with respect to what presently are considered to be preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

I claim:

1. A process for recycling waste sulfuric acid by decomposing organic contaminants by means of light energy, comprising exposing a waste sulfuric acid containing organic contaminants to a focused radiation emission having a wavelength in excess of 190 nm and an irradiation intensity within a range of from 0.01 to 100 MW/m$^2$, directly absorbing said focused radiation emission onto said waste sulfuric acid in a direct absorption receiver, and maintaining a temperature within a range of from 200° C. to 1000° C. in order to form sulfur trioxide and water as sulfuric acid decomposition products.

2. The process according to claim 1, wherein the waste sulfuric acid is exposed to said focused radiation emission as a stream of sulfur acid and air.

3. The process according to claim 2, wherein a volume ratio of waste sulfuric acid to air is adjusted to a value within a range from 0.01 to 100.

4. The process according to claim 3, wherein the volume ratio of waste sulfuric acid to air is adjusted to a value within the range of from 0.25 to 10.

5. The process according to claim 2, wherein said stream waste sulfuric acid and air is introduced into the reaction chamber in a direction that is opposed to the direction of said focused radiation emission.

6. The process according to claim 2, wherein said stream of waste sulfuric acid and air is fed into the reaction chamber in a direction that is perpendicular to the direction of said focused radiation emission that is from a plurality of radiators.

7. The process according to claim 1, wherein the radiation emission is supplied by direct solar radiation.

8. The process according to claim 7, further comprising using a central receiver system, a paraboloid concentrator, a fixed-focus concentrator or a solar furnace for focusing the solar radiation emission.

9. The process according to claim 1, wherein the temperature range is from 500° C. to 800° C.

10. The process according to claim 1, wherein the radiation emission having a wavelength in excess of 190 nm is selected from near UV and visible regions.

11. The process according to claim 1, wherein the irradiation intensity is within the range of from 0.1 to 10 MW/m$^2$.

12. The process according to claim 11, wherein the irradiation intensity is within the range of from 0.2 to 3 MW/m$^2$.

13. A process for recycling waste sulfuric acid by decomposing organic contaminants by means of light energy, comprising exposing a waste sulfuric acid containing organic contaminants to a focused radiation emission having a wavelength in excess of 190 nm and an irradiation intensity within a range of from 0.01 to 100 MW/m$^2$, directly absorbing said focussed radiation emission onto said waste sulfuric acid in a direct absorption receiver, and maintaining a temperature within a range of from 400° C. to 1500° C. in order to form sulfur dioxide oxygen and water as sulfuric acid decomposition products substantially free of sulfur trioxide.

14. The process according to claim 13, wherein the temperatures is within the range of from 700° C. to 1000° C.

15. The process according to claim 13, wherein the waste sulfuric acid is exposed to said focused radiation emission as a stream of sulfuric acid and air.

16. The process according to claim 15, wherein a volume ratio of waste sulfuric acid to air is adjusted to a value within a range of from 0.01 to 100.

17. The process according to claim 16, wherein the volume ratio of waste sulfuric acid is adjusted to value within the range of from 0.25 to 10.

18. The process according to claim 15, wherein the waste sulfuric acid and air stream is introduced into the reaction chamber in a direction that is opposed to the direction of said focused radiation emission.

19. The process according to claim 15, wherein the stream of waste sulfuric acid and air is fed into the reaction chamber in a direction that is perpendicular to the direction of said focused radiation emission from a plurality of radiators.

20. The process according to claim 13, wherein the radiation emission is supplied by direct solar radiation.

21. The process according to claim 20, further comprising using a central receiver system, a paraboloid concentrator, a fixed-focus concentrator or a solar furnace for focusing the solar radiation emission.

22. The process according to claim 13, wherein the focused radiation emission having a wavelength in excess of 190 nm is selected from near UV and visible regions.

23. The process according to claim 13, wherein the irradiation intensity is within the range of 0.1 to 10 MW/m$^2$.

24. The process according to claim 23, wherein the irradiation intensity within the range of from 0.2 to 3 MW/m$^2$.

25. A process for recycling waste sulfuric acid containing organic contaminants by exposing said waste sulfuric acid to a focused radiation emission having a wavelength in excess of 190 nm and an irradiation intensity within the range of from 0.01 to 100 MW/m$^2$, directly absorbing said focussed radiation emission onto said waste sulfuric acid in a direct absorption receiver, and maintaining a temperature within a range of from 200° C. to 1500° C., and wherein exothermic heat of reaction generated by a sulfuric acid-producing reverse reaction between sulfur dioxide and water, and heat from decomposition vapors are used to preheat and superheat waste sulfuric acid supplied to the reaction chamber.

26. A process for recycling waste sulfuric acid by decomposing organic contaminants photolytically by means of light energy, comprising the steps of exposing a waste sulfuric acid containing organic contaminants to a focused radiation emission having a wavelength in excess of 190 nm and an irradiation intensity within a range of from 0.01 to 100 MW/m$^2$, directly absorbing said focussed radiation emission onto said waste sulfuric acid in a direct absorption receiver, and maintaining a temperature within a range of from 200° C. to 1000° C. in order to form sulfur trioxide and water as sulfuric acid decomposition products, wherein the focused radiation emission step further is effected by artificial radiators and a light radiation from said artificial radiators is passed into the reaction chamber through a focusing step effected by an optical assembly comprising at least one of mirrors and lenses.

27. The process according to claim 26, wherein the artificial radiator step and the optical assembly focusing steps are effected at a location separated from the reaction chamber by windows.

28. The process according to claim 27, wherein the windows are protected from coatings caused by condensation or decomposition products by the step of passing an air flow over the surfaces thereof.

29. A process for recycling waste sulfuric acid by decomposing organic contaminants photolytically by means of light energy, comprising the steps of exposing a waste sulfuric acid containing organic contaminants to a focused radiation emission having a wavelength in excess of 190 nm and an irradiation intensity within a range of from 0.01 to 100 MW/m$^2$, directly absorbing said focussed radiation emission onto said waste sulfuric acid in a direct absorption receiver, and maintaining a temperature within a range of from 200° C. to 1000° C. in order to form sulfur trioxide and water as sulfuric acid decomposition products, wherein the radiation emission step is further effected by direct solar radiation and a focusing step wherein an elliptic or spherical mirror or a weakly concentrating vacuum tube collector focuses the solar radiation emission.

30. A process for recycling waste sulfuric acid by decomposing organic contaminants photolytically by means of light energy, comprising the steps of exposing a waste sulfuric acid containing organic contaminants to a focused radiation emission having a wavelength in excess of 190 nm and an irradiation intensity within a range of from 0.01 to 100 MW/m$^2$, directly absorbing said focussed radiation emission onto said waste sulfuric acid in a direct absorption receiver, and maintaining a temperature within a range of from 200° C. to 1000° C. in order to form sulfur trioxide and water as sulfuric acid decomposition products, wherein the radiation emission step is further effected by direct solar radiation and a focusing step wherein a line-focusing concentrator concentrates the solar radiation emission.

31. A process for recycling waste sulfuric acid by decomposing organic contaminants photolytically by means of light energy, comprising the steps of exposing a waste sulfuric acid containing organic contaminants to a focused radiation emission having a wavelength in excess of 190 nm and an irradiation intensity within a range of from 0.01 to 100 MW/m$^2$, directly absorbing said focussed radiation emission onto said waste sulfuric acid in a direct absorption receiver, and maintaining a temperature within a range of from 400° C. to 1500° C. in order to form sulfur dioxide, oxygen and water as sulfuric acid decomposition products substantially free of sulfur trioxide, wherein said focused radiation emission step is further effected by artificial radiators so that a light radiation from said artificial radiators is passed into the reaction chamber through a focusing step effected by an optical assembly comprising at least one of mirrors and lenses.

32. The process according to claim 31, wherein the artificial radiator step and the optical assembly focusing step are effected in an area separated from the reaction chamber by windows.

33. The process according to claim 32, including a protecting step wherein the windows are protected from coatings caused by condensation or decomposition products by passing an air flow over the surfaces thereof.

34. A process for recycling waste sulfuric acid by decomposing organic contaminants photolytically by means of light energy, comprising the steps of exposing a waste sulfuric acid containing organic contaminants to a focused radiation emission having a wavelength in excess of 190 nm and an irradiation intensity within a range of from 0.01 to 100 MW/m$^2$, directly absorbing said focussed radiation emission onto said waste sulfuric acid in a direct absorption receiver, and maintaining a temperature within a range of from 400° C. to 1500° C. in order to form sulfur dioxide, oxygen and water as sulfuric acid decomposition products substantially free of sulfur trioxide, wherein the radiation emission step is supplied by direct solar radiation, and a focusing step wherein an elliptic or spherical mirror or a weakly concentrating vacuum tube collector focuses the solar radiation emission.

35. A process for recycling waste sulfuric acid by decomposing organic contaminants photolytically by means of light energy, comprising the steps of exposing a waste sulfuric acid containing organic contaminants to a focused radiation emission having a wavelength in excess of 190 nm and an irradiation intensity within a range of from 0.01 to 100 MW/m$^2$, directly absorbing said focussed radiation emission onto said waste sulfuric acid in a direct absorption receiver, and maintaining a temperature within a range of from 400° C. to 1500° C. in order to form sulfur dioxide, oxygen and water as sulfuric acid decomposition products substantially free of sulfur trioxide, wherein the radiation emission step is supplied by direct solar radiation and a focusing step wherein a line-focusing concentrator is used for concentrating the solar radiation emission.

* * * * *